United States Patent Office 2,750,413
Patented June 12, 1956

2,750,413

SOLVENT RECOVERY OF ORGANIC ACIDS AND SALTS THEREOF

Lloyd T. Sandborn and William B. Stengle, Crossett, Ark., assignors to The Crossett Lumber Company, Crossett, Ark., a corporation of Arkansas No Drawing. Application November 3, 1952,
Serial No. 318,531

13 Claims. (Cl. 260—527)

This invention relates to the recovery of organic acids from a concentrate of the black liquor resulting from aklaline pulping processes in such a manner as to return to the pulp mill the soda and organic matter in a form in which they can be used in the conventional recovery system thereof.

While this invention is also quite applicable to the recovery of organic acids from a concentrate of the liquor resulting from cooking cellulosic material, such as wood or the like, in the presence of an alkali, this process of producing organic acids being disclosed and claimed in our copending application, Serial Number 318,533, filed November 3, 1952, for the sake of clarity and simplicity, the present invention will be described for the most part with reference to recovering organic acids from black liquor concentrate. Therefore, it is intended that the term "concentrate" used herein shall include both of said concentrates. Likewise, by the use herein of the expression "alkaline cook of cellulosic material," we intend to include black liquor from alkaline pulping processes as well as the liquor from the type cooks of said above mentioned copending application.

When wood is cooked with sodium hydroxide, as in the soda process, or with sodium hydroxide and sodium sulfide, as in the kraft process, part of the lignin and part of the hemicellulose dissolve and leave the cellulose in a form suitable for paper making. The solution containing the material which has dissolved during pulping is commonly called black liquor. It is usual practice to concentrate this liquor by evaporation and to burn the solids thereof in a furnace for recovery of the soda. Burning of the organic matter in the black liquor furnishes a large part of the heat requirements of the pulp mill. In the kraft process, the organic matter serves a further useful function by reducing sulfur compounds to sulfide. The molten residue from the furnace contains sodium carbonate and, in the kraft process, some sodium sulfide. By dissolving this material in water and treating it with calcium hydroxide, a solution of sodium hydroxide and sodium sulfide is obtained for re-use as cooking liquor for another batch of wood. In order for the pulping processes to be economical, it is necessary to minimize losses of soda, sulfur and organic matter.

It is known that black liquor contains sodium formate and sodium acetate. We have discovered that, in addition to these salts, black liquor also contains substantial quantities of sodium lactate and sodium glycolate. The acids of these salts (formic, acetic, lactic and glycolic) are the ones of chief concern according to this invention. They can be defined as saturated monocarboxylic acids having 1–3 carbon atoms in which one of the carbon atoms adjacent the carboxyl group can be substituted by an hydroxyl group. We have also found these four salts in appreciable quantities in the liquor obtained by cooking woody materials in the presence of an alkali according to our above identified copending application. Having established the identity of these two additonal valuable salts, the importance of recovering them from the liquor instead of burning them was apparent.

We know of no conventional process that would be satisfactory for the recovery of these acids. One such process involves acidifying the black liquor with a mineral acid, such as e. g. sulfuric acid, to liberate the desired organic acids from their salts and to precipitate undesired organic material. However, this process is far from being satisfactory. Its drawbacks include the following. 1. It converts all the soda to sulfate and thereby upsets the balance of a pulp mill recovery system by making it impossible to re-use the soda in the mill. 2. It leaves dissolved in the black liquor a substantial portion of the undesirable organic matter, the presence of which increases the difficulty of separating out said acids. 3. It requires a large amount of mineral acid and therefore is quite uneconomical The process disclosed and claimed in our co-pending application, Serial Number 318,532, filed November 3, 1952, for recovering these organic acids comprises treating the black liquor or other concenrtate with an alcohol, such as methanol, or a mixture of alcohols as solvent. Although such a process is quite satisfactory, we now have found that a substantially more complete separation of acids from undesirable material can be made by treating the concentrate with methanol followed by treating the methanol filtrate with a second solvent (e. g. butanol) characterized in that its mixture with methanol is a better solvent for the sodium salts of said acids than for the undesirable material in the concentrate, but which by itself is a poorer solvent than methanol for the sodium salts of these acids.

An object of the present invention is to provide a process for recovering organic acids from black liquor concentrate and a concentrate of the liquor resulting from an alakaline cook of cellulosic material. A further object is to provide such a process whereby organic acids are recovered with minimum losses of soda, sulfur and organic matter. An additional object is to provide such a process whereby a substantially complete and clean cut separation of organic acids from the concentrate can be made. A still further object is to provide such a process which is economical and relatively simple. Other objects will be apparent from the description of this invention given hereinafter.

The above and other objects are accomplished according to the present invention of separating from the concentrate of the black liquor resulting from alkaline pulping processes or a concentrate of the liquor resulting from an alkaline cook of cellulosic material, saturated monocarboxylic acids having 1–3 carbon atoms in which one of the hydrogen atoms on the carbon atom adjacent the carboxyl group may be substituted by an hydroxyl group, by employing a process which comprises contacting the concentrate with methanol. Then the methanol, containing the sodium salts of said acids along with some undesirable material, is filtered from the remainder of the concentrate. An appreciable proportion of the undesirable material is precipitated from the methanol filtrate by contacting it with an additional organic solvent. Contacting the methanol filtrate with the additional solvent forms two liquid layers. Then the bottom layer containing the undesirable material is separated from the top organic solvent layer in which some water is dissolved, and the organic solvents are removed from the latter. The resulting aqueous solution is acidified and the precipitate which forms is removed, leaving a mixture of said desired acids in aqueous solution. If only the sodium salts of said acids are desired, the steps of acidifying the filtrate and removing the resulting precipitate are omitted.

The requirements of the additional solvent include the following: (1) It is miscible with methanol. (2) It forms a mixture with the methanol filtrate in which mixture the salts of the acids are more soluble than the other constituents of the concentrate. (3) By itself it is a poorer solvent for said other constituents than is methanol. (4) Its boiling point is sufficiently different (preferably higher) from that of methanol to enable them to be readily separated by distillation. Preferably, it will either be immiscible with water or readily salted out of water, as is the case with isopropanol and tertiary butyl alcohol.

While we have found that n-butanol and isopropanol are quite well adapted for use as the additional solvent in the process of this invention, we have also found that a number of other solvents (such as e. g. the other propyl and butyl alcohols, the amyl alcohols, ethyl acetate, benzene, dioxane, and ether) can be used. The alcohols applicable as the additional solvent may be defined as monohydroxy liquid alcohols having at least three carbon atoms. By "liquid" is meant liquid at standard conditions of temperature and pressure.

N-butanol has certain advantages over isopropanol because it is less soluble in water. Consequently, when the methanol is removed from the methanol-butanol-water mixture, two clearly defined layers form, and most of the salts of the organic acids go into the aqueous layer. Another advantage in using butanol is that, while it will dissolve about 20% water, it can be dried easily by distilling the water out as a binary which boils at 92° C. In recycling the butanol in the process, it is desirable to dry it before adding it to the next batch of wet methanol; otherwise, there will be too much water in the mixed solvent and, instead of obtaining a tarry precipitate, a viscous syrupy layer will separate from the methanol-butanol solution and this syrupy material will carry with it some of the desired organic acid salts. In general, all the water-insoluble alcohols within the scope of this invention have the same advantage over the water-soluble alcohols as n-butanol does over isopropanol.

Although isopropanol is miscible in all proportions with water, the presence of water-soluble salts tends to decrease such miscibility. Apparently this is the reason that two layers form when isopropanol is used as described in Example 1 hereinafter.

While it is preferable to use a black liquor concentrate containing about 65% solids, material containing either more or less water can be used. Desirably, a water-methanol ratio of 1:5 to 1:10 and a butanol:methanol ratio of 1:1 to 1:2 will be used. Of course, with more water present it will be necessary to use larger amounts of solvents in order to obtain equally good results. Using larger amounts of solvents will obviously increase the cost of the process but in other respects will not alter the effectiveness of the process. The amount of solvent used preferably will vary directly with the amount of water present.

In many pulp mill operations, 65% solids is the most concentrated black liquor available, and for that reason alone it has been selected as the preferable starting material. While it is possible to use drier material, there is very little advantage in doing so and, too, further concentration of the black liquor would involve needless expense.

At 65% solids, the black liquor concentrate is fluid enough to be pumped while it is hot, but on cooling it assumes a heavy tar-like consistency. It is possible to reduce the viscosity of this tar by mixing in a little methanol. While a large amount of methanol will cause a precipitate, a small amount serves to make the material more fluid. It is preferable to thin the material in this manner before adding an amount of methanol that will cause precipitation. If all the methanol is added at once, there is a tendency for a precipitate to form on the surface, thereby preventing the desired contact between the methanol and the material in the center of the tar-like mass. Once the tar-like mass is thinned with methanol, addition of the rest of the methanol gives a finely divided precipitate which can be separated easily by centrifuging or filtering. It is not necessary to heat the mixture during precipitation, but if it is heated the precipitate will settle a little better and the amount of material precipiated will not be changed.

The precipitate which forms when butanol, or other poor solvent for black liquor solids, is added to the methanol solution settles quite rapidly. It can be separated immediately by centrifuging, or it will settle by gravity if it is allowed to stand for several hours. It settles more rapidly if the mixture is heated. Inasmuch as the next step in the process involves heating, it is practical to heat at this point and then decant the hot solution continuously through a demethanolizing column.

After removing the methanol, the two resulting layers are separated by drawing off the aqueous layer which is on the bottom. When butanol or other immiscible solvents are used, the solvent layer can be washed with water and the wash water can be added to the aqueous layer. Such washes will remove a small quantity of the sodium salts of organic acids, but, since the butanol is re-used in the process, the washes are not necessary.

In the case of water miscible solvents, such as isopropanol, it is not possible to wash the solvent layer. Either of two procedures can be employed. The isopropanol layer can be re-used directly by adding it to another batch of methanol-treated black liquor concentrate. Optionally, isopropanol can be distilled off from the demethanolized liquor, leaving an aqueous solution that is treated in the same manner as is used for treatment of the aqueous layer when it is separated from a solvent layer prior to distillation.

The aqueous solution that remains after removing the solvent contains the desired organic acids in the form of their sodium salts. There is also some other organic matter which appears to be of phenolic nature because it can be precipitated if carbon dioxide is passed into the solution. If the pH of this solution is lowered directly to a pH of about 2 to 2.5, e. g. by addition of a mineral acid, the organic acids are liberated and the precipitate forms simultaneously. After removing the precipitate, the organic acids can be recovered from the aqueous solution by extraction or by other known means. For example, the volatile acids, acetic and formic, can be removed with the water by distillation and the lactic and glycolic acids can be recovered from the residue by treatment with an alcohol to produce esters.

One desirable means of recovering soda (prior to the use of sulfuric acid for liberating the organic acids from their salts) in a form suitable for re-use in the pulp mill recovery process, is to neutralize the aqueous solution with carbonic acid. By treating the solution with carbon dioxide gas, or with gases such as stack gases which contain carbon dioxide, all of the soda except that which is tied up with organic acids is converted to sodium bicarbonate. A large portion of the sodium bicarbonate separates from the solution with the organic precipitate and can be returned to the pulp mill recovery furnace. If the volume of filtrate is large, it is desirable to concentrate the carbonated filtrate to recover an additional crop of sodium bicarbonate which, because of its lower solubility in water, is easily separated from the sodium salts of acetic, formic, lactic, and glycolic acids. Such removal of sodium bicarbonate reduces the amount of sulfuric acid required to convert the organic acid salts into free acids. As shown in Example 2, hereinafter, the amount of sulfuric acid can be reduced by this process to such an extent that 53% of the total acid requirement is used by the sodium in the organic acid salts.

While it is preferred to use carbon dioxide in the manner herein disclosed for the purpose of economy, direct acidification with mineral acid is equally effective from a technical standpoint. Preferably, sulfuric acid is used for liberation of the organic acids from their salts, because in the kraft process the sodium sulfate can be returned to the recovery. However, other mineral acids such as hydrochloric or phosphoric could be used for this purpose if one prefers to do so.

A slight modification of the procedure simplifies removal of an additional amount of sodium prior to acidification with sulfuric acid. This modification is described in Example 3 below. In this case, the mixed alcohol solution is subjected to the action of carbon dioxide under pressure before the methanol is removed. During such treatment, an appreciable amount of sodium bicarbonate or sodium carbonate separates from the solution. The removal of sodium salts in this manner may have enough advantage to pay for the extra cost of treatment over the method described in Example 2. A shown in Example 3, it does permit some additional saving in sulfuric acid.

We have found it very convenient to use the analytical procedure described by C. S. Marvel and R. D. Rands, Jour. Am. Chem. Soc., 72, 2642 (1950), to determine the amounts of acetic, formic, lactic and glycolic acids in the mixtures involved in this invention. Until recently no satisfactory method of analysis has been available. This partition chromatographic method is suitable for use even on crude mixtures where the amounts of each of the acids are less than one per cent of the total amount of organic matter present. By means of this method we have been able to establish that on the average the solids in black liquor contain about 3.5% sodium acetate, 5.8% sodium formate, 4.4% sodium lactate, and 2.3% sodium glycolate or a total of about 16% of the total solids as salts of these four acids. The rest of the material is a complex mixture of materials including organic matter derived from lignin and carbohydrates, sodium hydroxide, sodium carbonate and various other sodium salts. In the case of kraft black liquor, there is some sodium sulfide and various other sulfur compounds. For each part of sodium that is combined in the salts of the organic acids there are about three parts of sodium combined in other ways that must be neutralized, e. g. with sulfuric acid, before the desired acids can be liberated from their salts.

It is indicated that by alcohol treatment of black liquor according to this invention the concentration of organic acid salts in the dissolved material is practically doubled. This in itself is not the most important factor because, after these materials are acidified with sulfuric acid, a large part of this extraneous material precipitates and can be separated from the acid in a form suitable for return to the pulp mill recovery furnace. It is important, however, that for the material that dissolves in the alcohol only one to two parts of sulfuric acid are required in addition to each part of acid that reacts with the sodium in the organic acid salts as compared with three parts when the original black liquor is treated. This saving in sulfuric acid consumption is a measure of the amount of soda lost to the pulp mill which will need to be replaced by purchase of soda in some form such as sodium carbonate or sodium hydroxide. Since the cost of soda is greater than that of sulfuric acid, the savings made possible by this invention are much greater than the mere cost of the sulfuric acid alone. In case the kraft process is utilized a large part of the sodium sulfate which forms can be reused in the process, but this would be the case if the entire amount of black liquor would be acidified directly with sulfuric acid as in the conventional process described hereinbefore.

The following examples illustrate specific embodiments of the present invention, but the invention is not limited thereto except as defined in the appended claims. In each case the partition chromatographic method of analysis cited hereinbefore was used to determine the amount of desired organic acids present. In the examples, per cent is by weight.

EXAMPLE 1

In four separate tests, 50 grams of 65% black liquor concentrate (32.5 grams solids and 17.5 grams water) was mixed with 100 ml. of methanol. The mixture was centrifuged and the solution was decanted from the precipitated solids which contained approximately 30% of the original black liquor solids. The solution was placed in another centrifuge bottle and mixed with an amount of either isopropanol or normal butanol as indicated in Table 1 below. With each alcohol, 50 ml. and 100 ml. portions were used in separate tests. As soon as the isopropanol or butanol was added, a precipitate formed. When the mixture was centrifuged, the precipitate settled out as a heavy tarry bottom layer. The solution was decanted from the precipitate. In two cases, the filtrate and precipitate were analyzed for their solids content and for the acetic, formic and lactic acid that they contained. The data obtained are summarized in Table 1. In the two other cases, the methanol was distilled from the mixed alcohol by heating the mixture in a flask and taking the vapor off through a short packed column. When the methanol had been removed, the residue in the flask separated into two layers. The layers were separated and each layer was analyzed, giving the data which are summarized in Table 2 below. In addition, it was found that the aqueous layer from test 4, in which 3 ml. of butanol had been used for each gram of black liquor solids, the sulfuric acid required to react with the organic acid salts was 49% of the total amount of acid required to bring the solution to 2.5 pH.

Table 1

| Test No. | 1 | 2 |
| --- | --- | --- |
| Kind of alcohol | Isopropanol | N-Butanol |
| Amount of alcohol | 50 ml. | 50 ml. |
| Acids in solution, percent of amounts in black liquor concentrate: | | |
| Acetic | 54.6 | 72.6. |
| Formic | 58.5 | 74.2. |
| Lactic | 57.3 | 70.3. |
| Percent of black liquor solids in solution | 30 | 39. |
| Acids in precipitate, percent of amounts in black liquor concentrate: | | |
| Acetic | 7.1 | |
| Formic | 7.7 | |
| Lactic | 13.4 | |

Table 2

| Test No. | 3 | 4 |
| --- | --- | --- |
| Kind of alcohol | Isopropanol | N-Butanol. |
| Amount of alcohol | 100 ml. | 100 ml. |
| Acids, percent of acids in black liquor: | | |
| In alcohol layer— | | |
| Acetic | 32 | 23. |
| Formic | 19 | 9. |
| Lactic | 19 | 3. |
| In aqueous layer— | | |
| Acetic | 37 | 54.8. |
| Formic | 42 | 60.2. |
| Lactic | 33 | 59.8. |
| Solids, percent of black liquor solids: | | |
| Aqueous layer | 18 | 25. |
| Alcohol layer | 13 | 8. |

EXAMPLE 2

A 770 gram portion of 65% solids black liquor concentrate (500 grams solids, 270 grams water) was placed in a vessel and thinned with 150 ml. of methanol. An additional 1350 ml. of methanol was then added. The mixture was transferred to a flask fitted with a reflux condenser. The mixture was heated to boiling and then allowed to cool and settle. Most of the liquid was decanted and the precipitate was filtered with suction. The filtrate was combined with the solution that had been decanted, 1200 ml. of n-butanol was added and the mixture was allowed to stand over night. The alcohol solution was then decanted from the tar-like precipitate that had formed. This solution was placed in a flask under a 20 plate Bruun column. The methanol was distilled off while maintaining the boiling point of the distillate at 64° C.–65° C. by adjusting the reflux ratio and rate of take-off. The recovered methanol was used for treatment of another batch of black liquor concentrate. After the methanol had been removed, the residual solution in the flask was cooled and transferred to a separatory funnel. The aqueous bottom layer was removed and placed in a flask in which it was treated with carbon dioxide gas under a slight head of pressure until no more precipitate formed. At this point, the solution had a pH range of about 7 to 8.5. The precipitate was removed by filtration. If desired, the butanol that is dissolved in the aqueous solution can be removed by distillation before the solution is neutralized with carbon dioxide. If this is done, the precipitate which forms does not settle well and the solution needs to be heated to flock the precipitate. In either case, the amount of solids left in solution amounts to approximately 21.5% of the original solids in the black liquor, and the amounts of the salts of acetic, formic, and lactic acid are respectively about 59%, 56% and 50% of the amounts of these salts that were present initially in the black liquor concentrate.

If sulfuric acid is added to this solution to lower the pH to about 2.5, the organic acids are liberated from their salts and the sulfuric acid equivalent of the organic acids is about 53% of the total amount of sulfuric acid that is required.

EXAMPLE 3

A methanol-butanol solution prepared as described in Example 2 was placed in a pressure vessel. Carbon dioxide gas was added to maintain a gauge pressure of 700–800 p. s. i. for 16 hours. Then the pressure was released and the precipitate that had formed was removed by filtration. Methanol was then removed by distillation and the layers which formed were separated as described in Example 2. The water layer was found to contain sodium salts of acetic, formic, and lactic acid equivalent respectively to 57%, 48% and 51% of the acids originally present in the black liquor concentrate. The solids in the solution were approximately 16% of the original black liquor solids. When the solution was acidified to 2.6 pH with sulfuric acid, only a very small precipitate was obtained and 71% of the total sulfuric acid used, was used to neutralize the three organic acid salts listed above.

EXAMPLE 4

A 1205 gram portion of black liquor concentrate containing 64.8% solids was mixed with 2200 ml. of methanol and heated to 70° C. The mixture was filtered with suction on a Buchner funnel and the filter cake was washed with 250 ml. of methanol, the washings being combined with the original filtrate. The filtered methanol solution was mixed with 1877 ml. of normal butanol and allowed to stand over night. The solution was then decanted from the gummy precipitate that had formed. After distilling off the methanol as described in Example 2, the residual mixture consisted of two layers, the top layer being largely butanol and the bottom layer an aqueous solution containing the sodium salts of the desired acids. The layers were separated in a separatory funnel. The bottom layer was analyzed to determine its content of acetic, formic, lactic, and glycolic acids. The data which are tabulated below show the actual amounts of these acids that were present originally in the black liquor and the amounts that were found in the aqueous layer which separated from the butanol after removal of methanol.

| | Originally present in Black Liquor, grams | Amount in Aqueous layer, grams | Percent of Black Liquor Acids Recovered |
|---|---|---|---|
| Acetic | 20.7 | 12.2 | 58.9 |
| Formic | 30.2 | 19.7 | 65.2 |
| Lactic | 27.2 | 13.6 | 50.0 |
| Glycolic | 13.9 | 5.9 | 42.4 |

As many apparently widely different embodiments of this invention may be made without departing from the spirit and scope thereof, it is to be understood that the invention is not limited to the specific embodiments thereof except as defined in the appended claims.

What is claimed is:

1. Process of separating from a concentrate of the liquor resulting from an alkaline cook of cellulosic material, formic, acetic, lactic and glycolic acids and the sodium salts of said acids, which comprises contacting the concentrate with methanol; filtering the methanol, having dissolved therein said salts, from the remainder of the concentrate; precipitating undesirable material from the methanol filtrate by contacting same with an additional organic solvent and thereby obtaining two liquid layers; separating the top layer from the bottom layer; removing the organic solvents from said top layer and thereby leaving a mixture of said salts in aqueous solution, said additional solvent being selected from the group consisting of monohydroxy liquid alcohols having 3 to 5 carbon atoms, ethyl acetate, benzene, dioxane and ether.

2. Process of separating from a concentrate of the liquor resulting from an alkaline cook of cellulosic material, formic, acetic, lactic and glycolic acids, which comprises contacting the concentrate with methanol; filtering the methanol, having dissolved therein the sodium salts of said acids, from the remainder of the concentrate; precipitating undesirable material from the methanol filtrate by contacting same with an additional organic solvent and thereby obtaining two liquid layers; separating the top layer, containing said salts, from the bottom layer; removing the organic solvents from said top layer; then acidifying the top layer and thereby precipitating additional undesirable material and converting said salts to their acids; removing the latter precipitate and thereby leaving a mixture of said acids in aqueous solution; separating said acids from each other, said additional solvent being selected from the group consisting of monohydroxy liquid alcohols having 3 to 5 carbon atoms, ethyl acetate, benzene, dioxane and ether.

3. Process of separating from a concentrate of the liquor resulting from an alkaline cook of cellulosic material, formic, acetic, lactic and glycolic acids, which comprises contacting the concentrate with methanol; filtering the methanol, having dissolved therein the sodium salts of said acids, from the remainder of the concentrate; precipitating undesirable material from the methanol filtrate by contacting same with an additional organic solvent and thereby obtaining two liquid layers; separating the top layer, containing said salts, from the bottom layer; removing the organic solvents from said top layer; precipitating and removing undesirable material from said top layer by contacting same with carbon dioxide; then acidifying the top layer and thereby precipitating additional undesirable material and converting said salts to their acids; removing the latter precipitate and thereby leaving a mixture of said acids in aqueous solution, said additional solvent being selected from the group consisting of monohydroxy liquid alcohols having 3 to 5 carbon atoms, ethyl acetate, benzene, dioxane and ether.

4. Process of separating from a concentrate of the liquid resulting from an alkaline cook of cellulosic material, formic, acetic, lactic and glycolic acids and the sodium salts of said acids, which comprises contacting the concentrate with methanol; filtering the methanol, having dissolved therein said salts, from the remainder of the concentrate; precipitating undesirable material from the methanol filtrate by contacting same with a monohydroxy liquid alcohol having three to five carbon atoms and thereby obtaining two liquid layers; separating the top layer from the bottom layer; removing the alcohols from said top layer and thereby leaving a mixture of said salts in aqueous solution.

5. Process of separating from a concentrate of the liquor resulting from an alkaline cook of cellulosic material, formic, acetic, lactic and glycolic acids, which comprises contacting the concentrate with methanol; filtering the methanol, having dissolved therein the sodium salts of said acids, from the remainder of the concentrate; precipitating undesirable material from the methanol filtrate by contacting same with a monohydroxy liquid alcohol having three to five carbon atoms and thereby obtaining two liquid layers; separating the top layer, containing said salts, from the bottom layer; removing the alcohols from said top layer; then acidifying the top layer and thereby precipitating additional undesirable material and converting said salts to their acids; removing the latter precipitate and thereby leaving a mixture of said acids in aqueous solution; separating said acids from each other.

6. Process of separating from a concentrate of the liquor resulting from an alkaline cook of cellulosic material, formic, acetic, lactic and glycolic acids, which comprises contacting the concentrate with methanol; filtering the methanol, having dissolved therein the sodium salts of said acids, from the remainder of the concentrate; precipitating undesirable material from the methanol filtrate by contacting same with a monohydroxy liquid alcohol having three to five carbon atoms and thereby obtaining two liquid layers; separating the top layer, containing said salts, from the bottom layer; removing the alcohols from said top layer; precipitating and removing undesirable material from said top layer by contacting same with carbon dioxide; then acidifying the top layer and thereby precipitating additional undesirable material and converting said salts to their acids; removing the latter precipitate and thereby leaving a mixture of said acids in aqueous solution.

7. Process of separating from a concentrate of the liquor resulting from an alkaline cook of cellulosic material, formic, acetic, lactic and glycolic acids, which comprises contacting the concentrate with methanol; filtering the methanol, having dissolved therein the sodium salts of said acids, from the remainder of the concentrate; precipitating undesirable material from the methanol filtrate by contacting same with an additional organic solvent and thereby obtaining two liquid layers; separating the top layer, containing said salts, from the bottom layer; removing the organic solvents from said top layer; then acidifying the top layer and thereby precipitating additional undesirable material and converting said salts to their acids; removing the latter precipitate and thereby leaving a mixture of said acids in aqueous solution, said additional solvent being selected from the group consisting of monohydroxy liquid alcohols having 3 to 5 carbon atoms, ethyl acetate, benzene, dioxane and ether.

8. Process of separating from a concentrate of the liquor resulting from an alkaline cook of cellulosic material, formic, acetic, lactic and glycolic acids, which comprises contacting the concentrate with methanol; filtering the methanol, having dissolved therein the sodium salts of said acids, from the remainder of the concentrate; precipitating undesirable material from the methanol filtrate by contacting same with a monohydroxy liquid alcohol having three to five carbon atoms and thereby obtaining two liquid layers; separating the top layer, containing said salts, from the bottom layer; removing the alcohols from said top layer; then acidifying the top layer and thereby precipitating additional undesirable material and converting said salts to their acids; removing the latter precipitate and thereby leaving a mixture of said acids in aqueous solution.

9. Process of separating from a concentrate of the liquor resulting from an alkaline cook of cellulosic material, formic, acetic, lactic and glycolic acids, which comprises contacting the concentrate with methanol; filtering the methanol, having dissolved therein the sodium salts of said acids, from the remainder of the concentrate; precipitating undesirable material from the methanol filtrate by contacting same with butanol and thereby obtaining two liquid layers; separating the top layer, containing said salts, from the bottom layer; removing the alcohols from said top layer; then acidifying the top layer and thereby precipitating additional undesirable material and converting said salts to their acids; then removing the latter precipitate and thereby leaving a mixture of said acids in aqueous solution.

10. Process of separating from a concentrate of the liquor resulting from an alkaline cook of cellulosic material, formic, acetic, lactic and glycolic acids, which comprises contacting the concentrate with methanol; filtering the methanol, having dissolved therein the sodium salts of said acids, from the remainder of the concentrate; precipitating undesirable material from the methanol filtrate by contacting same with isopropanol and thereby obtaining two liquid layers; separating the top layer, containing said salts, from the bottom layer; removing the alcohols from said top layer; then acidifying the top layer and thereby precipitating additional undesirable material and converting said salts to their acids; removing the latter precipitate and thereby leaving a mixture of said acids in aqueous solution.

11. Process of separating from a concentrate of the liquor resulting from an alkaline cook of cellulosic material, formic, acetic, lactic and glycolic acids, which comprises contacting the concentrate with methanol; filtering the methanol, having dissolved therein the sodium salts of said acids, from the remainder of the concentrate; precipitating undesirable material from the methanol filtrate by contacting same with isopropanol and thereby obtaining two liquid layers; separating the top layer, containing said salts dissolved in a methanol-isopropanol-water mixture, from the bottom layer; distilling the methanol; separating the resulting isopropanol-water two layer mixture by decanting; then acidifying the water layer and thereby precipitating additional undesirable material and converting said salts to their acids; removing the latter precipitate and thereby leaving a mixture of said acids in aqueous solution.

12. Process of separating from a concentrate of the liquor resulting from an alkaline cook of cellulosic material, formic, acetic, lactic and glycolic acids, which comprises contacting the concentrate with methanol; filtering the methanol, having dissolved therein with sodium salts of said acids, from the remainder of the concentrate; precipitating undesirable material from the methanol filtrate by contacting same with butanol and thereby obtaining two liquid layers; separating the top layer, containing said salts dissolved in a methanol-butanol-water mixture, from the bottom layer; distilling the methanol; separating the resulting butanol-water two layer mixture by decanting; then acidifying the water layer and thereby precipitating additional undesirable material and converting said salts to their acids; removing the latter precipitate and thereby leaving a mixture of said acids in aqueous solution.

13. Process of separating from a concentrate of the liquor resulting from an alkaline cook of cellulosic material, formic, acetic, lactic and glycolic acids, which comprises contacting the concentrate with methanol; filtering the methanol, having dissolved therein the sodium salts of said acids, from the remainder of the concentrate; precipitating undesirable material from the methanol filtrate by contacting same with an additional organic solvent and thereby obtaining two liquid layers; separating the top layer, containing said salts, from the bottom layer; precipitating and removing undesirable material from said top layer by contacting same with carbon dioxide; removing the organic solvents from said top layer; then acidifying the top layer and thereby precipitating additional undesirable material and converting said salts to their acids; removing the latter precipitate and thereby leaving a mixture of said acids in aqueous solution, said additional solvent being selected from the group consisting of monohydroxy liquid alcohols having 3 to 5 carbon atoms, ethyl acetate, benzene, dioxane and ether.

References Cited in the file of this patent

UNITED STATES PATENTS

| | | |
|---|---|---|
| 413,243 | Alkier | July 1, 1890 |
| 1,177,746 | Laszloffy | Apr. 4, 1916 |

OTHER REFERENCES

Leonard et al., Ind. & Eng. Chem. vol. 40, pgs. 57–67 (1948).

McLaughlin, Chem. Abstracts, vol. 43, col. 7682 (1949).